United States Patent
Ota et al.

(10) Patent No.: US 8,412,044 B2
(45) Date of Patent: Apr. 2, 2013

(54) OPTICAL FIBER NETWORK WITH IMPROVED FIBER UTILIZATION

(75) Inventors: Yusuke Ota, Mountain Lakes, NJ (US); Jangsun Kim, Gyeonggi (KR)

(73) Assignee: Go! Foton Holdings, Inc., Somerset, NJ (US)

(*) Notice: Subject to any disclaimer, the term of this patent is extended or adjusted under 35 U.S.C. 154(b) by 517 days.

(21) Appl. No.: 12/462,220

(22) Filed: Jul. 31, 2009

(65) Prior Publication Data

US 2011/0026922 A1    Feb. 3, 2011

(51) Int. Cl.
*H04B 10/00* (2006.01)

(52) U.S. Cl. .......................... 398/72; 398/67

(58) Field of Classification Search .............. 398/66–73
See application file for complete search history.

(56) References Cited

U.S. PATENT DOCUMENTS

| | | | |
|---|---|---|---|
| 7,428,267 B2* | 9/2008 | Lee et al. | 375/260 |
| 7,440,696 B2* | 10/2008 | Ohkuma | 398/51 |
| 7,440,701 B2* | 10/2008 | Li et al. | 398/135 |
| 7,493,042 B2 | 2/2009 | Li et al. | 398/68 |
| 7,499,651 B2 | 3/2009 | Bouda et al. | 398/71 |
| 7,546,036 B2* | 6/2009 | Bouda et al. | 398/72 |
| 7,616,892 B2* | 11/2009 | Suzuki et al. | 398/72 |
| 7,627,246 B2* | 12/2009 | Sorin et al. | 398/63 |
| 7,783,201 B2* | 8/2010 | Miura et al. | 398/173 |
| 7,978,976 B2* | 7/2011 | Pohjola et al. | 398/72 |
| 2003/0180049 A1 | 9/2003 | Park | 398/72 |
| 2006/0056849 A1 | 3/2006 | Pamart et al. | 398/79 |
| 2007/0019956 A1* | 1/2007 | Sorin et al. | 398/71 |
| 2007/0183778 A1 | 8/2007 | Jung et al. | 398/72 |
| 2009/0080890 A1* | 3/2009 | Miura et al. | 398/72 |
| 2009/0110400 A1* | 4/2009 | Nozue et al. | 398/71 |
| 2010/0196010 A1* | 8/2010 | Miura | 398/72 |

* cited by examiner

*Primary Examiner* — Agustin Bello
(74) *Attorney, Agent, or Firm* — Ernest D. Buff; Ernest D. Buff & Assoc. LLC; Gordon E. Fish

(57) ABSTRACT

A passive optical network system and method in which at least part of the data is optically transmitted through a single optical fiber using a wavelength division multiplexing technique, with a plurality of signals being carried through the fiber in each direction, a different wavelength being used for each of the multiplexed upstream and downstream signals. The system may be retrofitted into existing telecommunications system to provide a multi-fold increase in the available bandwidth of long-distance optical fiber transmission.

28 Claims, 7 Drawing Sheets

OPTICAL FIBER NETWORK WITH IMPROVED FIBER UTILIZATION

BACKGROUND OF THE INVENTION

1. Field of the Invention

The present invention relates to an optical fiber communications network; and more particularly, to an optical fiber network system and method providing improved fiber utilization in the link between end-users and central stations.

2. Description of the Prior Art

Present telecommunications and computer systems require the high data-rate transmission of digital information between different circuits. These circuits may be in close proximity, such as within a single equipment cabinet, or they may be separated by very long distances. In the earliest stages, telecommunications involved transmission of electrical impulses carried using a wired connection, such as ordinary copper wires, a coaxial cable, or a conductive trace on a circuit board. Later, transmission was also carried wirelessly using microwave or satellite connections.

More recently, the alternative of transmitting data in the form of light pulses propagating through optical fibers has become increasingly prevalent, because of the vast increase in capacity afforded over what is possible either with either wired electrical connections or wireless satellite or microwave links. A single optical fiber, which may be thinner than a human hair, can carry far more data than a copper wire pair. In many circumstances, telecommunications providers already have physical right-of-way in the form of existing utility poles or underground conduit ducts. By replacing existing copper wires or cables in this right-of-way with optical fiber, demand for more bandwidth can be satisfied far more efficiently, and with less societal and environmental impact, than if new construction were required.

Optical fiber communication relies on the representation of binary digital data by a series of on/off light pulses. These pulses typically are generated by laser diodes (LDs) or light emitting diodes (LEDs) and injected into long fibers of glass or polymeric materials. The fibers are capable of propagating the light over extended distances with extremely low attenuation and dispersion, whereby information embodied in an on/off modulation pattern may be conveyed. The light pulses that emerge at the other end of the fiber can be detected and reconverted into electronic signals that reproduce the original electrical signal. Commonly, a single fiber is used for bidirectional communication, with the data transmitted in one direction represented by light pulses of one wavelength (color) and the data transmitted in the opposite direction represented by light pulses of a second wavelength. As used herein and in the subjoined claims, and in accordance with conventional parlance in the fiber optics art, the term "light" is employed for electromagnetic radiation that extends from the infrared to the ultraviolet, thus including both wavelengths perceptible to humans (about 380-750 nm) and wavelengths above and below the visible spectrum. For example, silica-fiber based systems frequently use wavelengths in the range of about 1.2-1.6 μm (1200-1600 nm), which are classified as near infra-red and are not visible to humans. Nevertheless, in the fiber-optic art, radiation at these wavelengths is still termed "light" and particular wavelengths are called "colors" by analogy.

Present-day optical fiber communication is often implemented in a telecommunications system in which a part of the network is generically called a passive optical network (PON) system. In the nomenclature of a typical telephony system, a central office or station may house some number of optical line termination stations (OLT) that provide an interface between electrical and optical signals. The OLTs are in communication on one side with data sources and on the other side are connected to an optical fiber that provides a bidirectional data path to end users. Each central office providing optical service must have at least one OLT, but usually there are a large number of OLTs.

At the other end, devices called optical network units (ONU) connect on one side to optical fiber from a central office OLT and on the other side through conductive wire to one or more customer devices, which can include telephones, computers, televisions, or the like. Normally, fiber from the central office is connected through a multiplexer/splitter to multiple ONUs. Each ONU is associated with a particular OLT, and at least one ONU is associated with each customer's location. The number of ONUs serviced by a given OLT depends on the amount of bandwidth each needs. The number of ONUs might typically be 32, but can also range up to about 256 or more in some circumstances.

The two directions of transmission are generally called "downstream" and "upstream," and refer, respectively, to data going in the direction from the OLT to the ONU, and the reverse direction from the ONU to the OLT. The ONU includes the electronic devices needed to convert incoming optical signals to the electrical signals needed by the various customer devices. Likewise, the ONU receives electrical impulses from these devices and converts them to optical pulses for upstream transmission. Corresponding conversions between optical and electrical signals are performed by the OLT at the central office.

Various forms of PONs have evolved to meet the ever-increasing demand for higher bandwidth, i.e., the amount of information that can be communicated per unit time. In order to ensure continuing compatibility between systems, standardized protocols for PONs have been promulgated by governmental regulatory authorities and standards-setting bodies. Prominent standard-setting bodies include the Institute of Electrical and Electronics Engineers (IEEE) and the International Telecommunications Union (ITU).

One common high-speed PON data transfer protocol which can be implemented using the present system is the GPON protocol, which specifies bidirectional operation with a data rate of about 2.5 gigabits per second (Gbps) in continuous-mode (CNT) transmission in the downstream direction and 1.25 Gbps in burst-mode (BM) transmission in the upstream direction. Other PON protocols are also compatible with practice of the present invention.

A typical, generic fiber optic system of the prior art for telephony is shown in FIG. 1. A PON system, depicted generally at 10, includes a plurality of OLTs 12a-12d, each being associated with a group 14a-14d of one or more ONUs. For example, OLT 12a serves ONU group 14a. Each ONU, in turn, is associated with one or more user devices (not shown) for which it handles upstream and downstream data transmission. It will be understood that while FIG. 1 illustratively shows a PON with four OLTs, the actual number may vary, typically from 1 to 8 or more. Likewise, each OLT may serve a number of ONUs ranging typically from 8 to 128 or more. Optical fibers 16, typically made of silica, connect each pair of nodes M and N, which may be separated by distances of up to about 20 km or more. Most commonly, the OLTs 12 and nodes M are all located in a single central office 8 of the telecommunications provider. At the user end, such as in an office building housing one or more office tenants, nodes N might all be located in one or more interior equipment cabinets or closets, with branches running to the various users. Individual nodes N might also be located in an exterior cabinet, which might be mounted on a utility pole, a ground-level pad, or in an underground vault, to serve end users in one or more buildings.

Signals from the OLT to the ONU in system 10 are carried through a fiber 16 as light pulses of a downstream wavelength, e.g. 1490 nm, while signals from the ONU to the OLT (upload or upstream direction), also carried through fiber 16, are assigned a different upstream wavelength, e.g. 1310 nm. The OLTs and ONUs provide an interface between optical fiber and electrical signals. That is to say, they convert between the upstream and downstream optical signals and corresponding electrical signals needed to connect with devices such as computers, telephone instruments, televisions, and other such implements. Each node N includes a splitter, which connects the incoming fiber to a plurality of fibers extending to the ONUs of that node's group. The splitter divides the optical intensity in the downstream data among the various ONUs, so each receives all the data. Conversely, the splitter aggregates (or multiplexes) upstream traffic from the various ONUs and injects the aggregated optical signal into the fiber serving the node for upload to the specified OLT. A suitable networking protocol implemented using a media access control (MAC) system is employed to identify and maintain the integrity of both the upstream and downstream data associated with each OLT, ONU, and end-user devices, and to govern the requisite routing and processing of the data particular to each end user. Frequently, the identity and integrity of the data in such a system is established by including in the data being exchanged suitable headers, addressing information, and delimiters and providing control signals that govern the timing of data transmission by the various devices and sources. MAC systems having the requisite capability for carrying out these functions are conventionally used in the telecommunications art.

The typical distance of up to about 20-30 km between nodes M and N in FIG. 1 arises from an interplay between the available optical power of feasible light sources, the attenuation of optical signals propagating through typical fibers, the amount of optical power available in each channel after division by the splitter, and the electronic sensitivity of typical optical receivers.

FIG. 2 depicts a graph showing the loss characteristic (dB/km loss) of conventional, single-mode silica fiber versus wavelength in the range of interest. It can be seen that some wavelengths are substantially more strongly attenuated than others. Various phenomena are believed to contribute to the losses, including Rayleigh scattering, which dominates at low wavelengths, and infrared absorption 22 by the fiber itself, which dominates at high wavelengths. Both these loss mechanisms vary relatively smoothly with wavelength. In addition, localized absorption in the fiber, caused by various impurities, including metals (peaks 24) and hydroxyl ions (peaks 26), produces absorption peaks centered over certain characteristic and relatively narrow wavelength ranges. These contributions together result in wavelength-dependent loss characteristic 28. Although fiber manufacturers have worked assiduously to make purer, more uniform fibers that somewhat reduce the absorption both in the impurity bands and overall, they cost much more. Moreover, it would be expensive and difficult to replace the vast amounts of older-generation fiber already in service, so that systems compatible with the installed base are particularly sought.

The widely used 1490 and 1310 nm base wavelengths are chosen because they are at approximate local minima in the absorption characteristic curve, while the 1550 nm wavelength is kept for optical video service. Light of the 1490, 1310, and 1550 nm wavelengths can transit 20-30 km of fiber without excessive attenuation or dispersion.

As a result of the continually increasing demand for high bandwidth digital data transmission, existing fiber installations are beginning to lack sufficient capacity to carry the desired amount of information. The problem is particularly acute in metropolitan areas, where installing new lines is especially difficult and expensive. Techniques that would increase the available bandwidth of existing fiber links are highly sought, in order to forestall or eliminate the need to install and maintain additional fiber connections. Especially desired are systems in which a single fiber could be used to connect multiple OLTs with multiple ONUs.

SUMMARY OF THE INVENTION

In one aspect, the present invention provides a system and method in which at least part of the data is optically transmitted through a single optical fiber using a wavelength division multiplexing technique, with a plurality of signals being carried through the fiber in each direction, a different wavelength being used for each of the multiplexed upstream and downstream signals. The system in this aspect may comprise a plurality of "N" optical line termination stations (OLTs) having an OLT optical connection. (For convenient reference herein and in the subjoined claims, the OLTs, and other components and features of the system associated with a particular one of the OLTs are designatable by sequential numbers 1 to N.) The system also includes a plurality of ONUs, each ONU having an ONU optical connection and being appointed to be in communication with a predetermined one of the OLTs. Each user device is appointed to be in communication with a predetermined one of the ONUs. A media access control system, including a media access controller (MAC) for each OLT, is configured to identify and maintain the integrity of both the upstream and downstream data associated with each OLT, ONU, and end user device. N OLT-side wavelength converters have an OLT port and a multiplexer port; each is associated with a particular one of the OLTs. An OLT-side optical multiplexer provides a common port and at least N branching ports, with the multiplexer ports of the OLT-side wavelength converters being connected to respective ones of these branching ports.

N ONU-side wavelength converters have an ONU port and a demultiplexer port, with each being associated with a corresponding one of the OLT-side wavelength converters. An ONU-side optical demultiplexer has at least N branching ports and one common port, with the demultiplexer port of each ONU-side wavelength converter being connected to one of the branching ports. The common ports of the OLT-side optical multiplexer and the ONU-side optical demultiplexer are connected by a multiplex optical fiber.

For all values of a descriptor "i" ranging from 1 to N, a unique intermediate downstream wavelength $\lambda_{iD}$ and a unique intermediate upstream wavelength $\lambda_{iU}$ are assigned to the "i-th" of the OLT-side wavelength converters and the "i-th" of the ONU-side wavelength converters; and the "i-th" OLT is connected for data communications via its OLT optical connection to the OLT port of the "i-th" OLT-side wavelength converter. The "i-th" OLT is configured: (i) to be communicatively coupled to one of the data sources, from which downstream data for the end user devices is to be received and to which upstream data from the end user devices is to be transmitted; (ii) to transmit the downstream data to the ONU predetermined for the OLT; (iii) to receive the upstream stream data from the predetermined ONU, (iv)

transmit the downstream data at a downstream base wavelength "$\lambda_{BD}$" and receive the upstream data at an upstream base wavelength "$\lambda_{BU}$."

Each of the ONUs is connected for data communications via its ONU optical connection to the ONU port of the ONU-side wavelength converter with which said ONU is associated. Each ONU is configured: (i) to be communicatively coupled to at least one of the end user devices, to which the downstream data is to be transmitted and from which the upstream data is to be received; (ii) to transmit said downstream data to the ONU predetermined for that OLT; (iii) to receive the upstream stream data from the predetermined ONU; and (iv) transmit the downstream data at a downstream base wavelength "$\lambda_{BD}$" and receive the upstream data at an upstream base wavelength "$\lambda_{BU}$" through an OLT optical connection;

Further provided is an improved method for bidirectional optical transmission of downstream and upstream digital data traffic between a plurality of "N" OLTs, designatable by sequential numbers from 1 to "N" and communicatively connected to a plurality of data sources, and an equal plurality of "N" ONU groups. Each ONU group is associated with a specific one of the OLTs and comprises at least one ONU, with each ONU being communicatively connected to at least one end user device. The data traffic comprises downstream data sets, each appointed to be transmitted from one of the data sources to a specific one of the end user devices and upstream data sets, each appointed to be transmitted from one of the end user devices to a specific one of the data sources. Each said downstream data set is optically transmitted from one of the OLTs and received by the ONU associated therewith as downstream light having a downstream base wavelength $\lambda_{BD}$. Each upstream data set is optically transmitted from one of the ONUs and received by the OLT associated therewith as upstream light having an upstream base wavelength $\lambda_{BU}$.

The improvement comprises: (i) converting the light at wavelength $\lambda_{BD}$ transmitted by the "i-th" OLT to converted downstream light having a unique intermediate downstream wavelength $\lambda_{iD}$; (ii) multiplexing the converted downstream light into multiplexed downstream light comprising a plurality of downstream spectral components, each encompassing one of the intermediate downstream wavelengths $\lambda_{iD}$; (iii) transmitting the multiplexed downstream light through a multiplex optical fiber; (iv) demultiplexing the multiplexed downstream light transmitted through the multiplex optical fiber to separate the downstream spectral components; (v) reconverting light of each of the downstream spectral components back into reconverted light at the downstream base wavelength $\lambda_{BD}$; (vi) receiving light reconverted from the downstream spectral component encompassing wavelength $\lambda_{iD}$ at the "i-th" ONU; (vii) converting the light at wavelength $\lambda_{BU}$ transmitted by the "i-th" ONU to converted upstream light having a unique intermediate upstream wavelength $\lambda_{iU}$; (viii) multiplexing the converted upstream light into multiplexed upstream light comprising a plurality of upstream spectral components, each encompassing one of the intermediate upstream wavelengths $\lambda_{iU}$; (ix) transmitting the multiplexed upstream light through the multiplex optical fiber; (x) demultiplexing the multiplexed upstream light transmitted through the multiplex optical fiber to separate the upstream spectral components; (xi) reconverting light of each of the upstream spectral components back into reconverted light at the upstream base wavelength $\lambda_{BU}$; and (xii) receiving light reconverted from the upstream spectral component encompassing wavelength $\lambda_{iU}$ at the "i-th" OLT.

Beneficially, the improved system can be retrofitted into existing telephony systems, still maintaining the existing OLTs and ONUs, and their respective connections to existing data sources and existing end user devices. The additional hardware and connection changes required can be located, respectively, at the central office near the existing OLTs and at the equipment cabinets or other like locations of the existing ONUs.

In some implementations of the present system and method, an auxiliary channel is also provided. This channel may be used for any requisite function, including data management and control or monitoring or surveilling the interconnecting optical fiber, which may be many km long. In many instances, the data rate needed for these functions is lower than that desired for the base data communications, so lower data rates may be used in both directions. As a result, the auxiliary wavelengths employed may include choices that would experience too much attenuation to sustain higher transfer rates.

BRIEF DESCRIPTION OF THE DRAWINGS

The invention will be more fully understood and further advantages will become apparent when reference is had to the following detailed description of the various embodiments of the invention and the accompanying drawings, wherein like reference numerals denote similar elements throughout the several views, and in which.

DETAILED DESCRIPTION OF THE INVENTION

Figure 1:
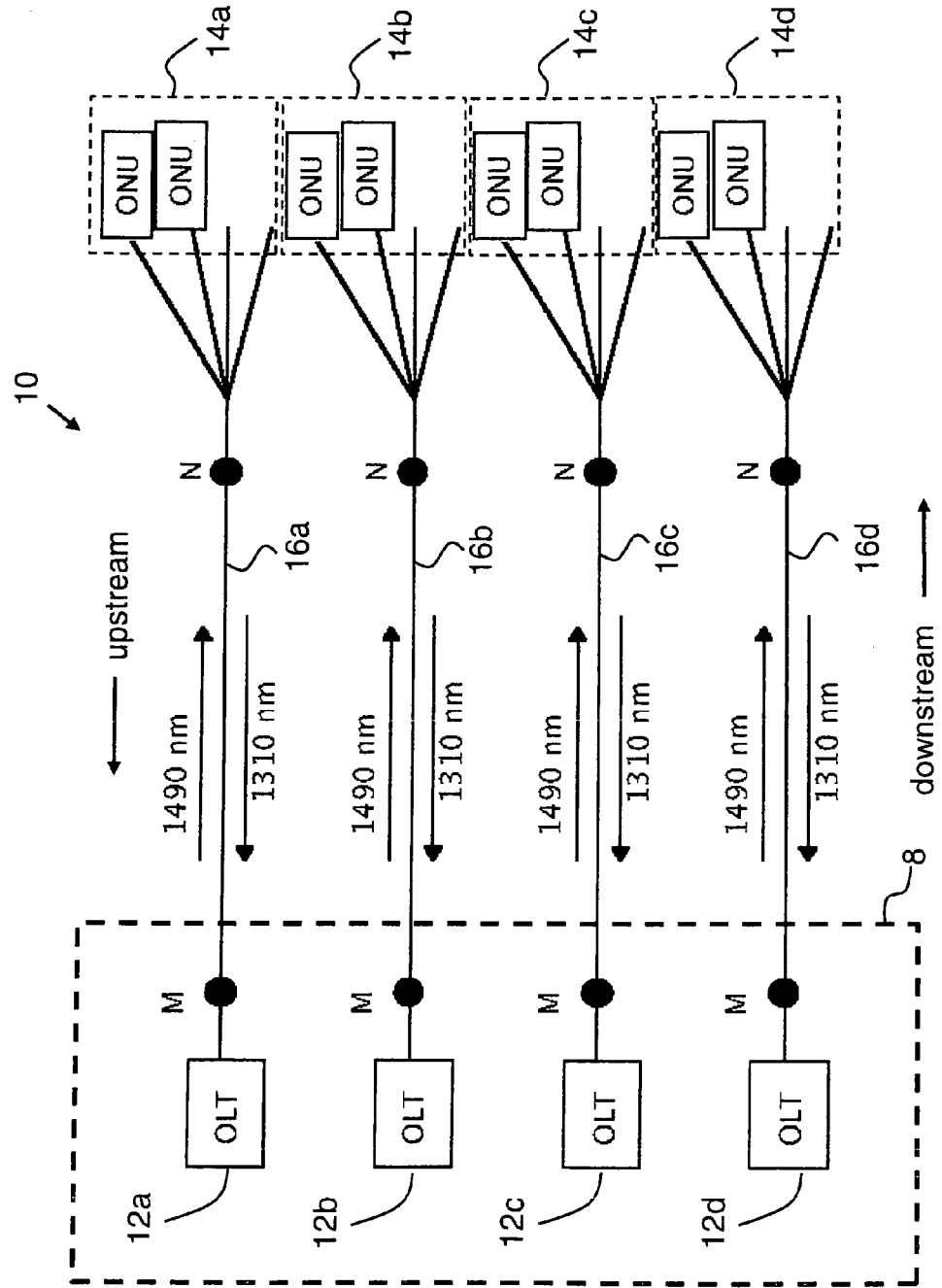
FIG. 1 is a block schematic diagram showing a prior art PON system.
Figure 3:
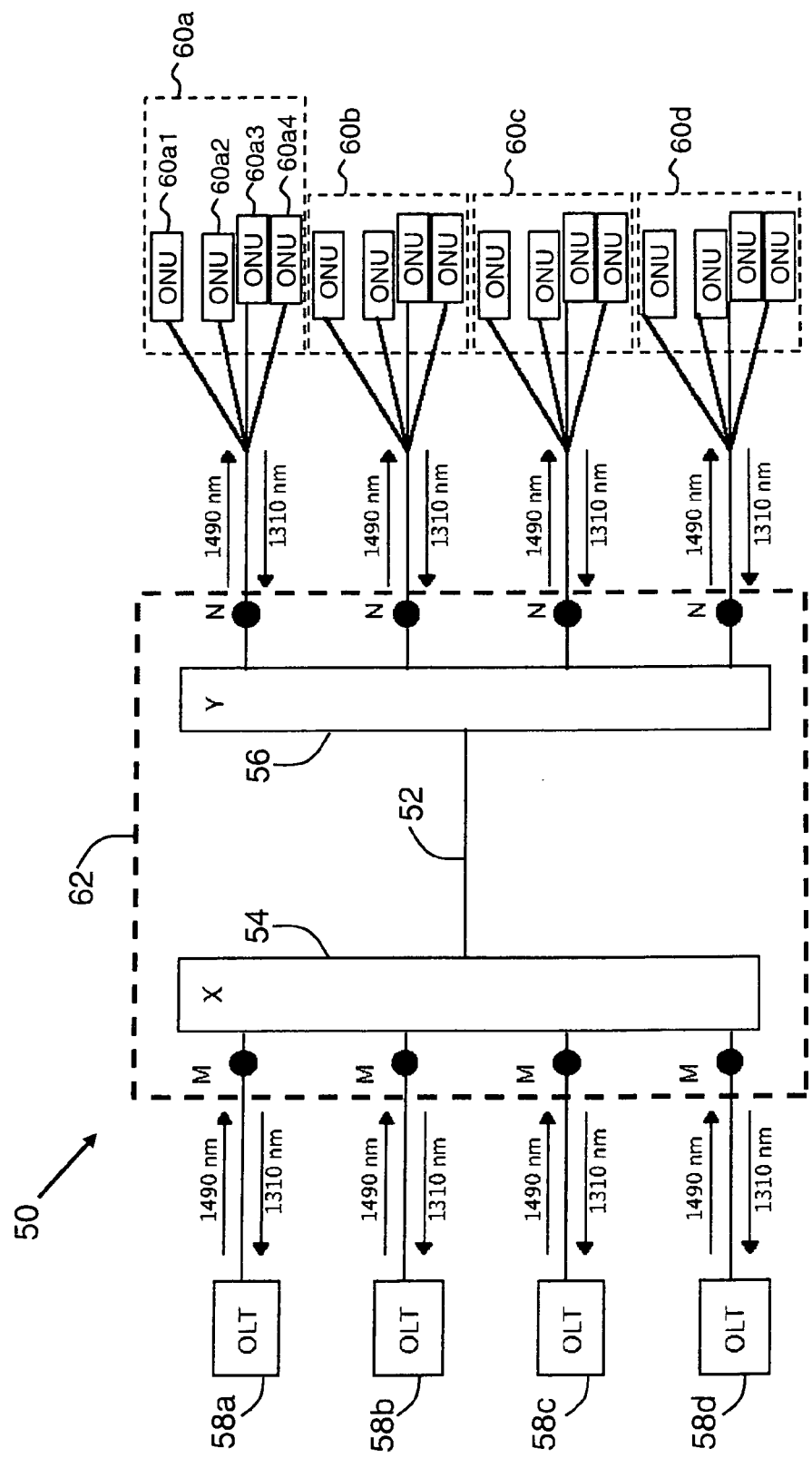
FIG. 3 is a block schematic diagram showing a PON system of the invention.

One implementation of the present system is schematically depicted generally at 50 in FIG. 3. A single fiber 52 is used to connect an OLT-side interface 54 with an ONU-side interface 56. These interfaces in turn connect to plural OLTs and ONUs. A conventional system (FIG. 1) requires a separate fiber carrying both upstream and downstream base wavelengths (e.g. 1490 and 1310 nm) to connect each OLT to a specific ONU node that serves one or more particular ONUs. In contrast, the present system 50 preferably uses a single fiber 52 to convey data bidirectionally between multiple OLTs (e.g. OLTs 58a-58d) and a corresponding number of ONU nodes (e.g. the nodes serving ONU groups 60a-60d). Each ONU group may comprise one or more individual ONUs (e.g. ONUs 60a1 . . . 60a4 seen in FIG. 3). The elimination of multiple fibers is made possible by multiplexed transmission of data at multiple upstream and downstream wavelengths, instead of just one pair of wavelengths. It will be understood that FIG. 3's depiction of four OLTs and associated ONU groups is exemplary, and other numbers of OLTs and ONUs are also possible. The number of ONUs served from each ONU node may also vary.

Use of an arrangement like that of FIG. 3 is especially beneficial in high density metropolitan areas. For example, a single large office building might house many separate businesses with hundreds or even thousands of employees. The telecommunications needs for these entities might involve many OLTs at a central office and many more ONUs in the building. Typically, a given OLT might service up to 128 or more ONU groups, each typically comprising 1 to 128 ONUs. In the conventional implementation of FIG. 1, each OLT 12 would require a single fiber 16 for the connection with its group of ONUs 14. Substituting the present system permits up to 8 or more OLTs to share a single fiber, providing an immediate eight-fold increase in bandwidth without installing any new fibers, and while retaining both the existing OLTs and ONUs and their respective connections to data sources and end user devices. The change only requires installing certain new devices at the central office location of the OLTs and at the location of the various ONUs. While the present system may be employed beneficially in new construction, it is especially useful in retrofitting existing PONs, wherein the OLTs and ONUs are already installed and interfaced with data sources and end-use devices. These connections need not be disrupted. Instead, new hardware is only disposed between the existing OLTs and ONU nodes.

Figure 4:
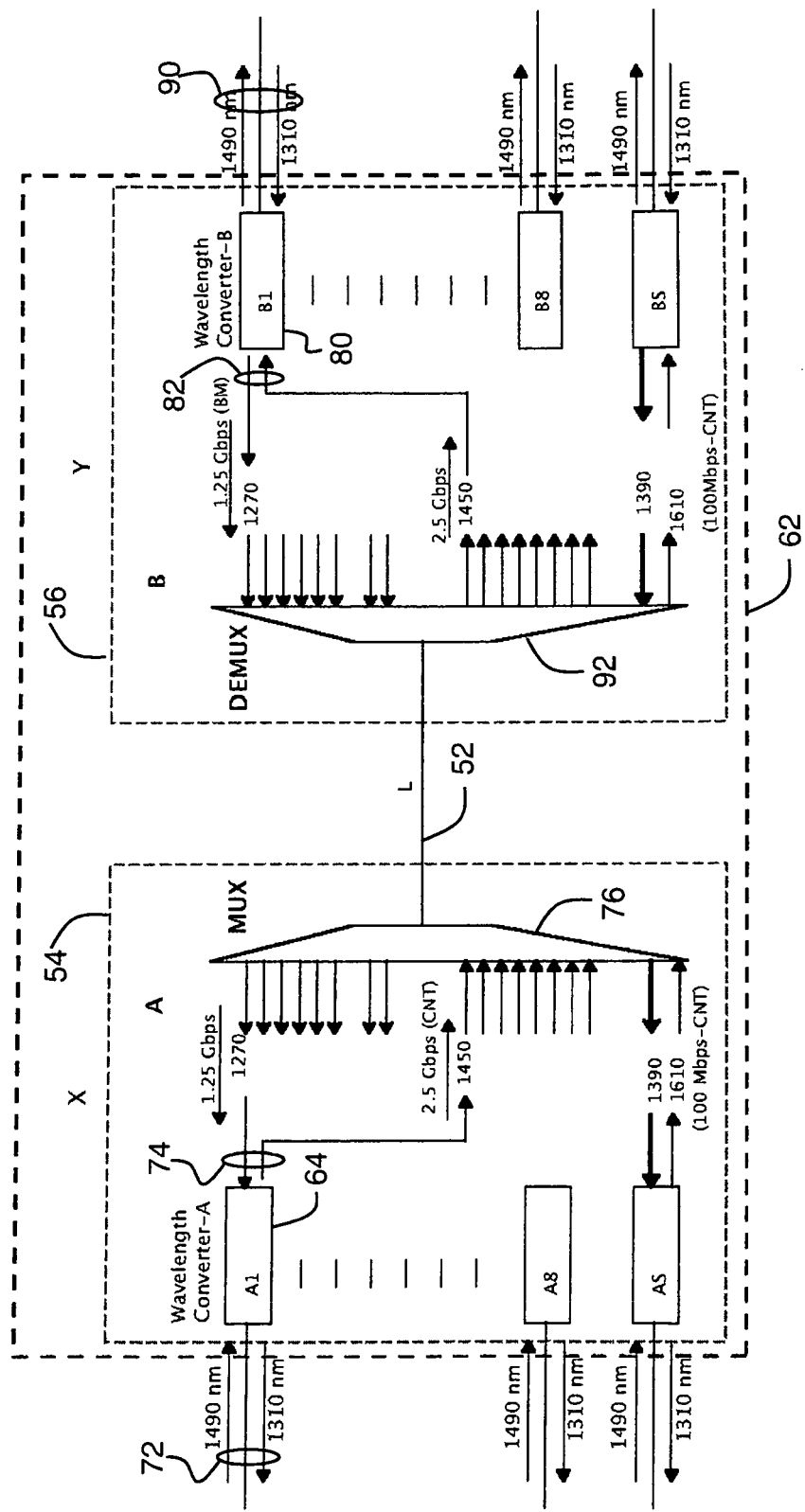
FIG. 4 is a block schematic diagram showing portions of a PON system of the invention.

The configuration of an implementation of the present PON system 50 of FIG. 3 is further elucidated by FIG. 4, which provides additional detail of the configuration within OLT-side interface X (54) and ONU-side interface Y (56). This version of the system is configured to be connected to eight OLTs, designated as 58a-58h (not shown in FIG. 4). Each of the OLT-side wavelength converters A1-A8 is associated with one of the connected OLTs. OLT-side interface X also includes an optional auxiliary channel converter AS, whose structure and function are discussed in more detail later.

On the ONU side, interface Y includes eight counterpart ONU-side wavelength converters B1-B8 and optional auxiliary channel converter BS. Each of the ONU-side wavelength converters is, in turn, associated with the node serving one particular ONU group, as is apparent from FIG. 3.

A pair of unique intermediate wavelength pairs, one each for upstream and downstream, is assigned to each of the complementary OLT-side and ONU-side wavelength converters. In one possible implementation, these intermediate wavelengths are chosen in accordance with a coarse wavelength division multiplexing (CWDM) arrangement. Each of interfaces X and Y further includes multiplexer/demultiplexer (MUX/DEMUX) circuitry that connects on one side through branching ports to a plurality of fibers, each carrying data at one of the intermediate wavelength pairs and on the other side through a common port to a single fiber that links the interfaces and carries multiplexed data between them.

Figure 5A:
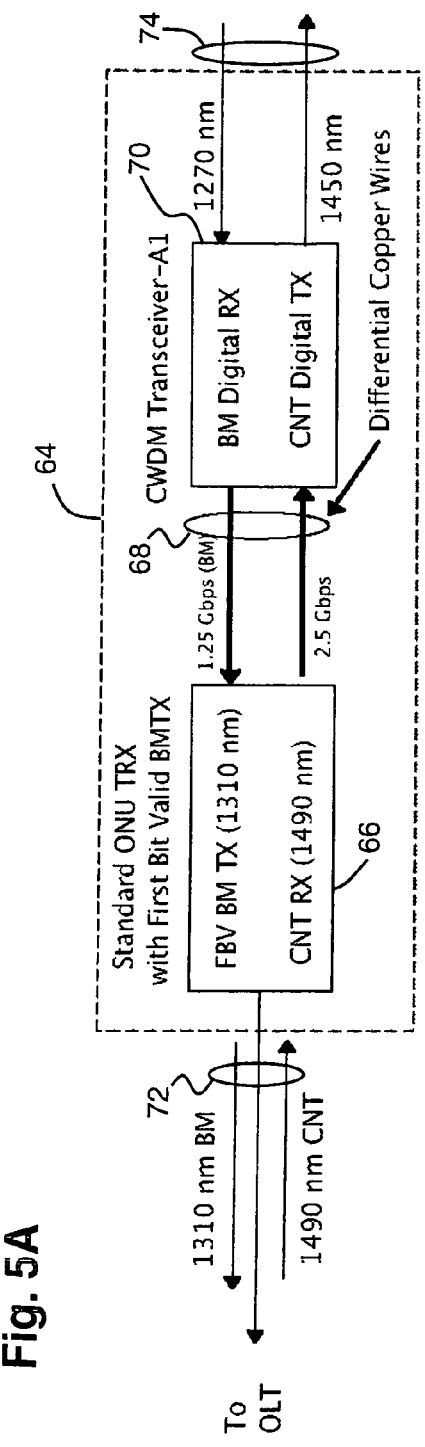
FIGS. 5A and 5B are block schematic diagrams of exemplary wavelength converter circuits used in OLT-side and ONU-side interfaces, respectively.
Figure 5B:
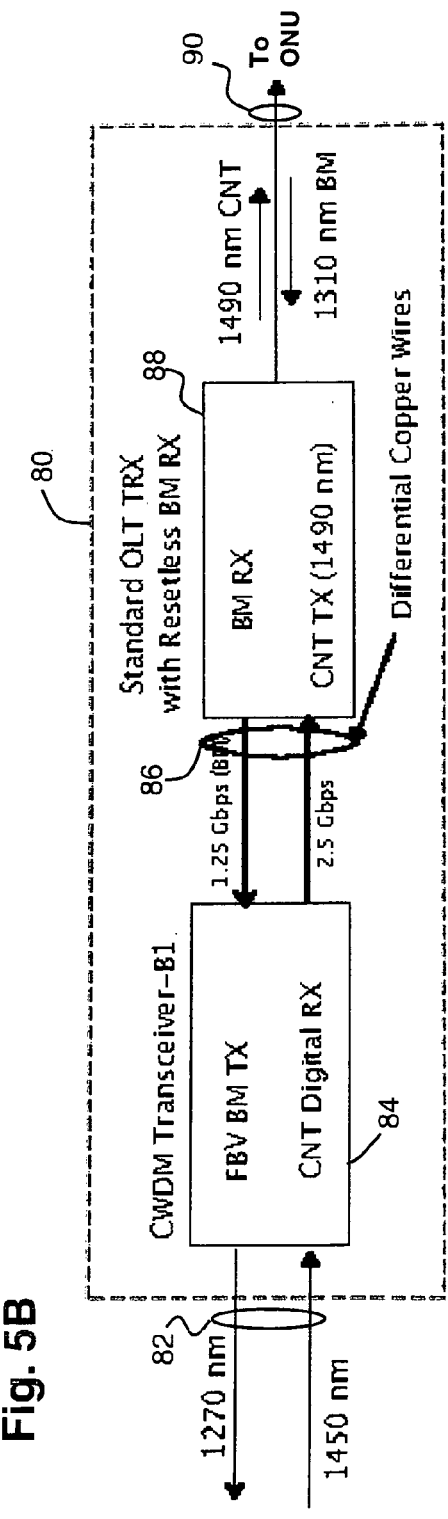

FIGS. 5A and 5B show exemplary OLT-side and ONU-side wavelength converter circuits used in the interfaces X and Y of FIG. 4, respectively. These circuits convert the base wavelength (e.g., 1310/1490 nm) optical data conventionally used in both the ONU and OLT to and from a pair of unique, predetermined intermediate wavelengths that are multiplexed with light of other intermediate wavelengths for bidirectional transmission over a single fiber 52 between interfaces X and Y.

The OLT-side wavelength converter circuit 64 shown in FIG. 5A and designated A1 is exemplary. Optical fiber 72 operably connects converter circuit 64 at its OLT port to an OLT optical connection of an OLT (e.g., OLT 58a) configured to process 1490 nm downstream continuous-mode (CNT) data and 1310 nm upstream burst-mode (BM) data. Circuit 64 is operable to convert $\lambda_{BU}$=1310 nm/$\lambda_{BD}$=1490 nm optical data borne by fiber 72 to optical data at $\lambda_{1U}$=1270 nm/$\lambda_{1D}$=1450 nm borne on fiber 74.

Figure 7:
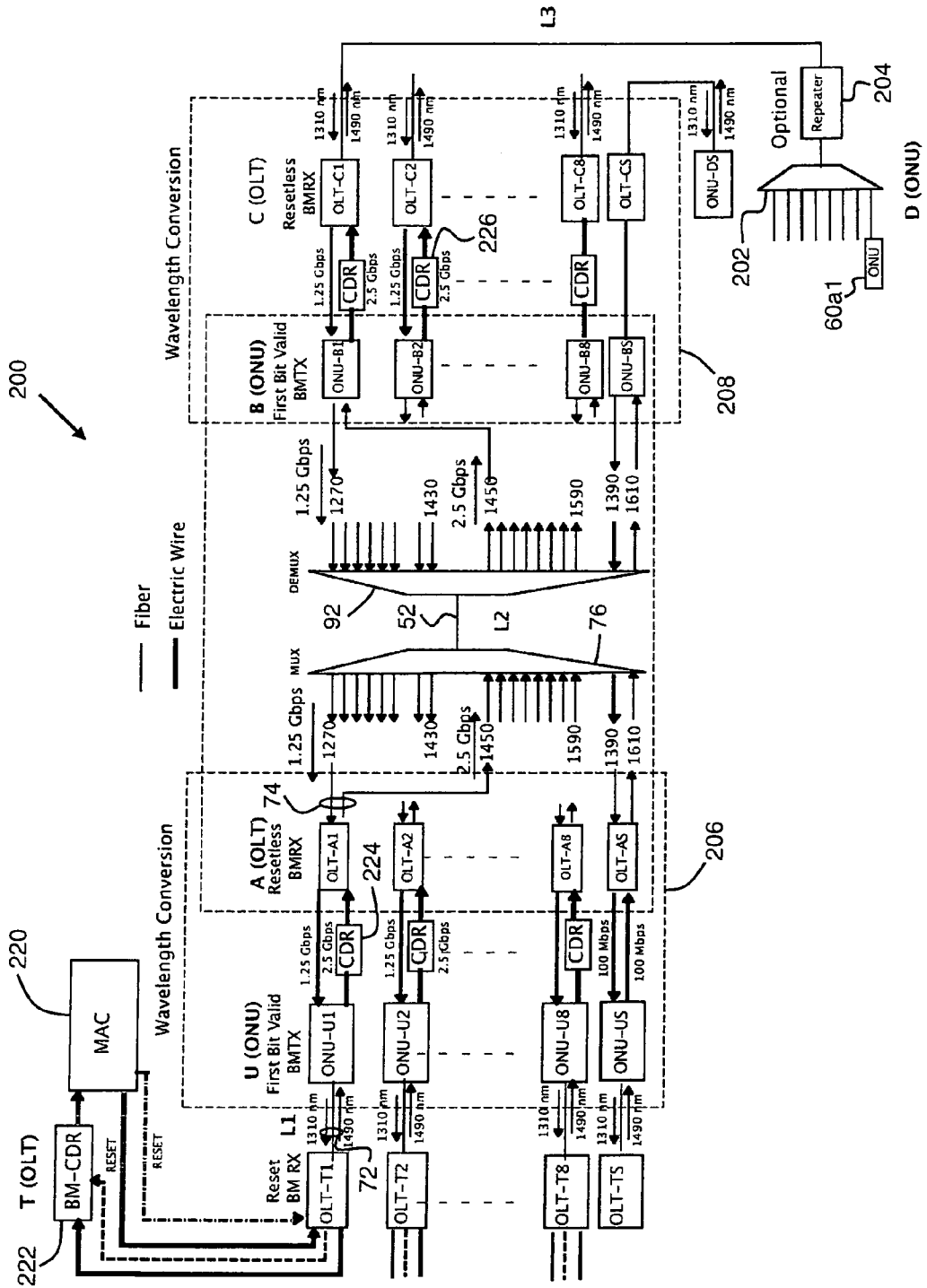
FIG. 7 is a block schematic diagram showing a fuller, system-level depiction of an implementation of the present invention.

Within circuit 64, downstream 1490 nm CNT optical signals are coupled to a receiver circuit within ONU TRX circuit 66 that converts incoming optical data pulses to corresponding electrical pulses on one wire of differential pair 68. A clock-data recovery (CDR) circuit 224, as shown in FIG. 7, is optionally included to reshape the electrical pulses. The downstream electrical pulses are then reconverted to light within CWDM transceiver A1 circuit 70. This light, at a new wavelength (e.g., 1450 nm for converter A1), is injected into fiber 74, which is connected at the wavelength converter's multiplex port. In the upstream direction, incoming BM light (at 1270 nm for converter A1) is received by BM Digital RX circuitry within transceiver 70 and converted to an electrical signal on the other wire of differential pair 68. This electrical signal is reconverted to light at 1310 nm using a first-bit valid (FBV) BM TX circuit in ONU TRX 66, and thereafter injected back into the OLT connection via fiber 72. The FBV feature is preferred so that the integrity of a burst-mode data stream is fully maintained.

Further within OLT-side interface X (54), wavelength converter A1 circuit 64 communicates bidirectionally with one side of MUX circuit 76 through optical fiber 74, which connects at one of the MUX's branching ports and carries data at the 1450 and 1270 nm intermediate wavelengths. The other OLT-side wavelength converter circuits (A2-A8) likewise communicate with MUX 76, but with each operating with its own assigned, unique intermediate wavelength pair. MUX circuit 76 is operable to aggregate the downstream data traffic at the various intermediate downstream wavelengths and inject them as a multiplexed downstream optical signal through its common port into fiber 52. MUX 76 is also operable to receive a multiplexed upstream optical signal on fiber 52, which bears information from the ONUs at the various intermediate upstream wavelengths. MUX 76 demultiplexes this signal and routes the information conveyed at each wavelength to the appropriate one of optical fibers 74 for upstream processing by the appropriate one of wavelength converters A1-A8. One channel and branching port of MUX 76 may be used for the optional auxiliary channel described below. Suitable components for constructing MUX 76 are known in the art.

ONU-side interface Y (56) includes DEMUX circuit 92 and plural ONU-side wavelength converters, e.g. B1-B8. DEMUX 92 is a counterpart of MUX 76 and is operable in a complementary fashion. Multiplexed, downstream traffic carried at the plurality of downstream intermediate wavelengths is coupled from fiber 52 into DEMUX 92 at its common port. DEMUX 92 separates the colors and routes each to the appropriate wavelength converter through its branching ports. In the exemplary implementation shown, 1450 nm downstream light is sent to converter B1 via fiber 82, which converts it to light at the expected base wavelength of 1490 nm. DEMUX 92 also receives BM upstream data at the various upstream intermediate wavelengths from the various ONU-side wavelength converters 80, and multiplexes them for injection into fiber 52. Circuitry and a branching port of DEMUX 92 may be provided for the optional auxiliary channel.

The circuitry 80 of exemplary wavelength converter B1 of FIG. 5B carries out functions complementary to those of wavelength converter A1, converting 1450/1270 nm data traffic back to 1490/1310 nm. Downstream CNT optical data in fiber 82, e.g. at 1450 nm for converters A1 and B1, is received at the wavelength converter's demultiplexer port and transformed by CNT RX circuitry in CWDM Transceiver B1 of circuit 84 to electrical pulses on one wire of differential pair 86. A CDR circuit 226 (see FIG. 7) is optionally included to reform and re-time the downstream data pulses. These pulses drive CNT TX of OLT TRX circuit 88 to produce 1490 nm data injected into fiber 90 for delivery to the ONU through the wavelength converter's ONU port. Upstream BM data at 1310 nm, coming through fiber 90 from the ONU, is received by burst-mode receiver circuitry BM RX in circuit 88. These data are converted to electrical pulses on the other wire of pair 86 connected to FBV BM TX circuitry in CWDM Transceiver B1, which converts them to optical pulses at the desired intermediate upstream wavelength, e.g. 1270 nm for converter B1, that are carried by fiber 82. Use of FBV valid arrangement for the upstream burst mode is preferred in circuit 80 for the same reasons as in the OLT-side wavelength converter.

The remaining converters, designated as A2 to A8 on the OLT-side and B2 to B8 on the ONU-side, are similar in function and structure to A1 and B1. They connect on one side to fiber carrying data at the same single pair of base wavelengths ($\lambda_{BD}$, $\lambda_{BU}$), but function with different intermediate wavelengths drawn from other available pairs preselected within the CWDM arrangement [($\lambda_{2D}$, $\lambda_{2U}$) ... ($\lambda_{8D}$, $\lambda_{8U}$)].

Figure 2:
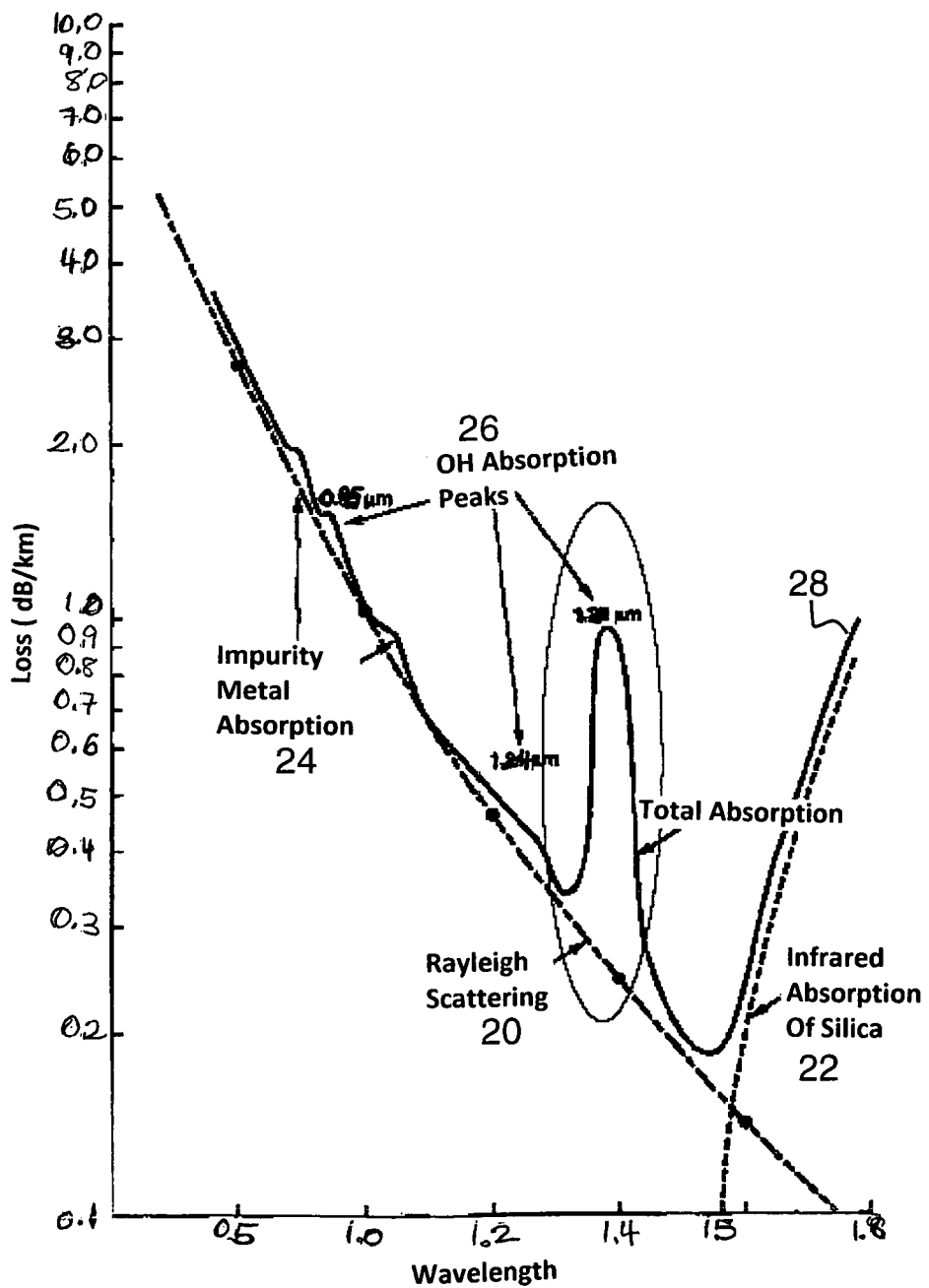
FIG. 2 is a graph showing the loss characteristic of conventional, single-mode silica optical fiber.

A representative CWDM protocol useful in some implementations of the present system is defined by the ITU-T G.694.2 standard, which identifies channels having center wavelengths of 1270 to 1610 nm, spaced at 20 nm intervals. The ITU-T G.694.2 standard is incorporated herein in the entirety by reference thereto. In practice, not all the channels in the CWDM protocol are equally attractive and usable, because some of the wavelengths coincide with the absorption peaks in typical silica fiber (FIG. 2). The present system is preferably implemented using intermediate wavelength pairs, one being selected for each pair from the group of 1270, 1290, 1310, 1330, 1350, 1370, 1390, 1410, and 1430 nm for upstream and one being selected from the group of 1450, 1470, 1490, 1510, 1530, 1550, 1570, 1590, and 1610 nm for downstream. More preferably, up to eight wavelength pairs are chosen, with 1390 nm and 1610 nm being excluded. The absorption at the remaining wavelengths is low enough to allow acceptable Gbps-rate transmission over the desired distance. Optionally, two of the wavelengths (e.g., 1390 nm and 1610 nm) are used for an auxiliary channel, which is discussed in greater detail below. Other selections of multiplexed intermediate wavelengths are also possible, generally limited only by restriction to wavelengths for which optical attenuation in the selected fiber is low enough for the required transmission distance and by maintaining a channel spacing compatible with the wavelength selectivity of optical components that are feasible for a given application.

For example, dense wavelength division multiplexing (DWDM) uses narrower spacing between channels, and thus could provide many more channels and higher net bandwidth. One representative definition of a DWDM protocol is provided by ITU-T standard G-694.1, which is incorporated herein in the entirety by reference thereto. However, the close channel spacing in DWDM necessitates use of much more expensive components to generate, detect, and demultiplex optical signals at precisely defined wavelengths. Such precision is needed to prevent cross-talk between channels. The tight spectral purity requirements inherent in the close channel spacings of DWDM render components for its implementation more expensive and difficult to use, since wavelength drift resulting from temperature variations must be carefully limited. Nevertheless, in some circumstances the substantial increase in bandwidth afforded by using more multiplexed wavelengths in the long-distance fiber connection outweighs the extra cost and complexity of the hardware needed to implement a more highly multiplexed protocol such as DWDM in the present system.

Figures 6A, 6B:
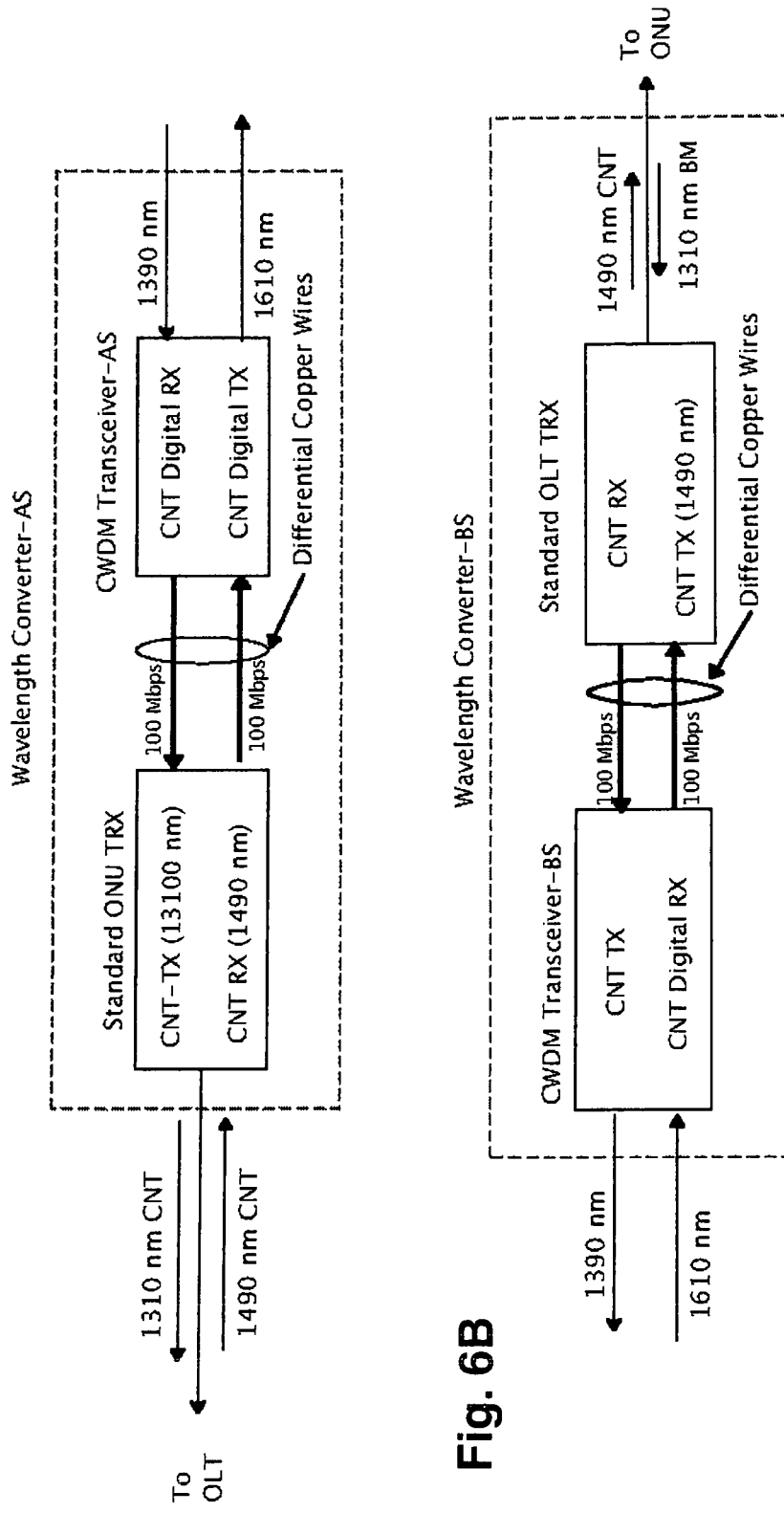
FIGS. 6A and 6B are block schematic diagrams of exemplary wavelength converter circuits respectively used in the OLT-side and ONU-side interfaces of the present system as part of an optional auxiliary channel.

Whatever the intermediate wavelengths chosen, pairs of counterpart ONT and ONU side converters must be employed that are capable of converting the chosen intermediate wavelength pairs to and from the base wavelengths. As seen in FIG. 4, the present system also includes an optional auxiliary, bidirectional communications channel that operates in a manner similar to that of data channels 1-8. Wavelength converters AS and BS, respectively situated in OLT-side interface X and ONU-side interface Y and shown in FIGS. 6A and 6B, effect conversion of data carried on a base optical wavelength pair ($\lambda_{BD}$, $\lambda_{BU}$) to a pair of intermediate auxiliary wavelengths ($\lambda_{SD}$, $\lambda_{SU}$), using techniques and circuitry comparable to those in converters A1-A8 and B1-B8. However, the auxiliary channel is ordinarily and preferably implemented with continuous-mode transmission in both directions instead of the burst-mode preferably used for the upstream transmission in the data channels, with data rates in both directions lower than those used for data channels 1-8. For the converters of FIGS. 6A and 6B, $\lambda_{SD}$=1610 nm and $\lambda_{SU}$=1390 nm.

The auxiliary channel may be used for any suitable purpose, such as surveillance and monitoring of the integrity of the optical fiber. In many instances, these functions do not require as much bandwidth as is desired for the data links. As a result, the intermediate auxiliary wavelengths may be chosen from wavelengths in which optical attenuation is too high to sustain Gbps-level data rates, such as those used in GPON. For example, it has been found that the attenuation of 1390 and 1610 nm wavelengths is too high for these to be used reliably at the 1.25/2.5 Gbps rates of GPON systems, but low enough that less demanding communication at a 100 Mbps rate is still feasible. This distinction is believed to arise from the greater sensitivity of receivers operable at 100 Mbps than at 1.25/2.5 Gbps. As a result, propagation of 100 Mbps data at 1390/1610 nm, though more strongly attenuated, can coexist with the transmission of 1.25/2.5 Gbps data at the other frequencies in the present CWDM implementation, as discussed above.

A system-level depiction of a GPON implementation of the present optical network is depicted generally at 200 in FIG. 7.

In a conventional GPON system, only the components of sections T and D of FIG. 7 would be used. Section T comprises 8 standard OLT transceivers 58a ... 58i, each interfaced with a conventional media access controller (MAC) 220. A burst-mode clock-data recovery (CDR) circuit 222 is used to recover the timing needed to process 1.25 Gbps data in the upstream channel. The requisite reset signal for CDR circuit 222 is provided from the BM RX in the OLT, and CDR 222 in turn resets MAC 220. The OLTs 58 also include a CNT TX circuit operative at 2.5 Gbps for downstream transmission. On the ONU side of a conventional GPON system, a conventional ONU multiplexer/splitter 202, as illustrated in section D, would be provided for each of the 8 channels shown. Each ONU multiplexer/splitter 202 includes one ONU splitter common port and plural ONU splitter branching ports. Individual optical fibers carrying data bidirectionally at base wavelengths $\lambda_{BD}$ and $\lambda_{BU}$ would directly connect each ONU multiplexer/splitter 202 with its corresponding OLT 58a ... 58i. Individual ONUs, e.g. ONU 60a1, would be connected to one of the multiplexer/splitters 202 by an optical fiber through intervening ONU repeater 204, which is optionally included if necessary to amplify and reform the optical signal.

In the full system of FIG. 7, intervening circuitry and components, such as those detailed above in FIGS. 4-6, substitute for the direct pair-wise fiber connection of OLTs and ONUs or ONU nodes in the conventional system.

On the OLT side of the FIG. 7 system, OLT-side wavelength converters A1-A8 (previously described and detailed in FIG. 5A) and optional converter AS (FIG. 6A) are shown within wavelength conversion block 206. Each of data channel converters A1-A8 is connected in a conventional manner by a relatively short, single-mode optical fiber to one of the OLTs 58a . . . 58i. The two major circuits of each converter (the ONU (T) and OLT (A)) typically are separate components connected by a pair of conductive wires in differential mode, though an integrated construction is also possible. A clock-data recovery (CDR) circuit 224 is optionally placed in the downstream electrical connection between the downstream receiver 66 and the downstream transmitter of circuit 70. Because of the minimal spacing between OLTs 58 and circuits 66, the 1.25 Gbps $\lambda_{BU}$ transmitter section of circuit 66 can operate at lower power and the 2.5 Gbps $\lambda_{BD}$ receiver can have lower sensitivity than would be needed for a normal configuration an ONU is a long distance from the OLT with which it is in communication. The transmitter section also must be a first-bit valid type, since the upstream signal is in burst mode. The auxiliary channel converter AS operates with transmit and receive capabilities, both in CNT mode and at a lower 100 Mbps data rate.

On the ONU side, wavelength conversion block 208 includes ONU-side wavelength converters B1-B8 and optional auxiliary channel converter BS. Just as in OLT-side conversion block 206, the two major groups of circuits are the ONUs of section B and the OLTs of section C. Each ONU group is served by one of the ONU-side wavelength converters, typically using a conventional multiplexer/splitter 202 and optional ONU repeater 204. For each ONU multiplexer/splitter 202, the ONU splitter common port is connected to the ONU and each end user device is connected to one of the ONU splitter branching ports

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A passive optical fiber network system configured for bidirectional transmission of downstream and upstream digital data traffic between a plurality of data sources and a plurality of end user devices, the data traffic comprising data to be transmitted specifically to and from one or more of said end user devices, the system including:

a plurality of said data sources appointed to be in communication with OLTs designatable by sequential numbers 1 to 'N'; and a plurality of end user devices being appointed to be in communication with a plurality of ONUs, said ONUs being equal in number to said OLTs forming 'N' ordered pairs a predetermined one of said ONUs being appointed to be in communication with a predetermined one of said OLTs; and a media access control system present in each of the OLTs having a burst mode clock data recovery circuit to recover the timing needed for each of data transmission and configured to identify and maintain the integrity of both the upstream and downstream data associated with each of OLT, ONU, and end user device, and wherein:

each OLT is configured:
   i. to be communicatively coupled to one or more of the data sources, from which downstream data for corresponding said end user devices is to be received and to which upstream data from said end user devices is to be transmitted;
   ii. to transmit said downstream data to the predetermined ONU from said OLT;
   iii. to receive said upstream stream data from said predetermined ONU; and
   iv. said OLT transmitting said downstream data at a downstream base wavelength "$\lambda_{BD}$" and receiving said upstream data at an upstream base wavelength "$\lambda_{BU}$" through an OLT optical connection; and each ONU is configured:
   i. to be communicatively coupled to at least one of the end user devices, to which said downstream data is to be transmitted and from which said upstream data is to be received;
   ii. to receive said downstream data from the OLT in communication with said ONU;
   iii. to transmit said upstream stream data to said OLT; and
   iv. said ONU receiving said downstream data at said downstream base wavelength $\lambda_{BD}$ and transmitting said upstream data at said upstream base wavelength $\lambda_{BU}$ through an ONU optical connection;

the improvement wherein the system further comprises:
   N OLT-side wavelength converters, each said converter being associated with a particular on of said OLTs and having an OLT port and a multiplexer port;
   N ONU-side wavelength converters, each said converter being associated with a particular one of said OLT-side wavelength converters and having an ONU port and a demultiplexer port;
   said bidirectional communication between OLT multiplexer port and ONU port being effected through a single optical fiber as a high Gbps rate upstream burst mode signal with a first bit valid verification to ascertain the integrity of a burst-mode data stream as well as a high Gbps continuous mode downstream signal corresponding to each of N OLT side devices and each of N ONU side devices;
   said single optical fiber additionally carrying an auxiliary channel operating at a low Gbps rate continuous mode signal monitoring the integrity of the optical fiber operating at a wavelength that is subject to attenuation;
   an OLT-side optical multiplexer having at least N branching ports and one common port;
   an ONU-side optical demultiplexer having at least 'N' branching ports and one common port; and wherein, for all values of "i" ranging from 1 to 'N':
   a unique intermediate downstream wavelength $\lambda_{iD}$ and a unique intermediate upstream wavelength $\lambda_{iU}$ are assigned to the "i-th" of said OLT-side wavelength converters and the "i-th" of said ONU-side wavelength converters;
   the "i-th" said OLT is connected for data communications via its OLT optical connection to the OLT port of the "i-th" said OLT-side wavelength converter;
   each of said ONUs is connected for data communications via its ONU optical connection to the ONU port of the ONU-side wavelength converter with which said ONU is associated;

said multiplexer port of the "i-th" said OLT-side wavelength converter is communicatively coupled to the "i-th" said branching port of said OLT-side optical multiplexer;

said demultiplexer port of the "i-th" said ONU-side wavelength converter is communicatively coupled to the "i-th" said branching port of said ONU-side optical demultiplexer;

a multiplex optical fiber communicatively connects said common port of said OLT-side optical multiplexer and said common port of said ONU-side optical demultiplexer;

the "i-th" said OLT-side wavelength converter is operable to convert light at wavelength $\lambda_{BD}$ that is input at its OLT port to light at a wavelength $\lambda_{iD}$ carrying said downstream data that is output at its multiplexer port, and to convert light at wavelength $\lambda_{iU}$ carrying said upstream data that is input at its multiplexer port to light at wavelength $\lambda_{BU}$ that is output at its OLT port;

the "i-th" said ONU-side wavelength converter is operable to convert light at wavelength $\lambda_{iD}$ that is input at its demultiplexer port to light at wavelength $\lambda_{BD}$ carrying said downstream data that is output at its ONU port, and to convert light at wavelength $\lambda_{BU}$ carrying said upstream data that is input at its ONU port to light at wavelength $\lambda_{iU}$ that is output at its multiplexer port;

said OLT-side optical multiplexer is operable to:
i. receive through its "i-th" branching port downstream data at said intermediate downstream wavelength $\lambda_{iD}$ for i having all values from 1 to N, and aggregate and output all said downstream data as a multiplexed downstream data signal through its common port to said multiplex optical fiber; and
ii. receive from said multiplex optical fiber through its common port an upstream multiplexed data signal including light of any one or more of said intermediate upstream wavelengths and demultiplex said signal by sending substantially all of the light of wavelength $\lambda_{iU}$ to said i-th branching port of said multiplexer for i having all values from 1 to N;

said ONU-side optical demultiplexer is operable to:
i. receive through its "i-th" branching port upstream data at said intermediate upstream wavelength $\lambda_{iU}$ for i having all values from 1 to N, and aggregate and output all said upstream data as said upstream multiplexed upstream data signal through its common port to said multiplex optical fiber; and
ii. receive from said multiplex optical fiber through its common port said multiplexed downstream data signal including light of any or all of said intermediate downstream wavelengths and demultiplex said signal by sending substantially all of the light of wavelength $\lambda_{iD}$ to the i-th branching port of said multiplexer, for i having all values from 1 to N.

2. An improved system as recited by claim 1, further comprising:
an auxiliary OLT having an auxiliary OLT optical connection;
an auxiliary ONU having an auxiliary ONU optical connection;
an auxiliary OLT-side wavelength converter having an auxiliary OLT port and an auxiliary multiplexer port; and
an auxiliary ONU-side wavelength converter having an auxiliary ONU port and an auxiliary demultiplexer port;
and wherein said auxiliary OLT and said auxiliary ONU are appointed to be in bidirectional communication for transmission of auxiliary downstream data of low Gbps data monitoring the integrity of the multiplex optical fiber from said auxiliary OLT to said auxiliary ONU and transmission of auxiliary upstream data from said auxiliary ONU to said auxiliary OLT through said multiplex optical fiber;

said auxiliary OLT is configured to transmit said auxiliary downstream data at said downstream base wavelength $\lambda_{BD}$ and receive auxiliary upstream data at said upstream base wavelength $\lambda BU$, through said auxiliary OLT optical connection;

said auxiliary OLT is connected via its auxiliary OLT optical connection to said auxiliary OLT port of said auxiliary OLT-side wavelength converter for data communications at said downstream base wavelength $\lambda_{BD}$ and said upstream base wavelength $\lambda_{BU}$;

said auxiliary multiplexer port is communicatively coupled to one of said branching ports of said OLT-side optical multiplexer;

said auxiliary ONU is configured to receive said auxiliary downstream data at said downstream base wavelength $\lambda_{BD}$ and transmit said auxiliary upstream data at said upstream base wavelength $\lambda_{BU}$, through said auxiliary ONU optical connection;

said auxiliary ONU is connected via its auxiliary ONU optical connection to said auxiliary ONU port of said auxiliary ONU-side wavelength converter for data communications at said downstream base wavelength $\lambda_{BD}$ and said upstream base wavelength $\lambda_{BU}$;

said auxiliary demultiplexer port is communicatively coupled to one of said branching ports of said ONU-side optical demultiplexer;

said auxiliary OLT-side wavelength converter is operable to convert light at wavelength $\lambda_{BD}$ that is input at said auxiliary OLT port to light at an auxiliary downstream wavelength $\lambda_{SD}$ carrying said downstream data that is output at said auxiliary multiplexer port, and to convert light at wavelength $\lambda_{SU}$ carrying said upstream data that is input at said auxiliary multiplexer port to light at an auxiliary upstream wavelength $\lambda_{BU}$ that is output at said auxiliary OLT port;

said auxiliary ONU-side wavelength converter is operable to convert light at wavelength $\lambda_{SD}$ that is input at said auxiliary demultiplexer port to light at wavelength $\lambda_{BD}$ carrying said downstream data that is output at said auxiliary ONU port, and to convert light at wavelength $\lambda_{BU}$ carrying said upstream data that is input at said auxiliary ONU port to light at wavelength $\lambda SU$ that is output at said auxiliary multiplexer port;

said OLT-side optical multiplexer is operable to receive said auxiliary downstream data at said wavelength $\lambda_{SD}$ through one of its branching ports and output said auxiliary downstream data through its common port and to receive said auxiliary upstream data at said wavelength $\lambda_{SU}$ through its common port and output said auxiliary upstream data through said one of its branching ports; and said ONU-side optical demultiplexer is operable to receive said auxiliary upstream data at said wavelength $\lambda_{SU}$ through one of its branching ports and output said auxiliary upstream data through its common port and to receive said auxiliary downstream data at said wavelength $\lambda_{SD}$ through its common port and output said auxiliary upstream data through said one of its branching ports.

3. A passive optical fiber network system for bidirectional transmission of downstream and upstream digital data traffic between a plurality of data sources and a plurality of end user devices, the data traffic comprising data to be transmitted specifically to and from one of said data sources and one of said end user devices, the system comprising:

a plurality of OLTs in communication with said data sources and designatable by sequential numbers 1 to "N", each OLT having an OLT optical connection;

a plurality of ONUs, each said ONU having an ONU optical connection and being appointed to be in communication with a predetermined one of said OLTs said ONUs being equal in number to said OLTs forming an ordered pairs and each said user device being appointed to be in communication with a predetermined one of said ONUs;

a media access control system present in each of the OLTs having a burst mode clock recovery circuit to recover the timing needed for each of data transmission and configured to identify and maintain the integrity of both the upstream and downstream data associated with each OLT, ONU, and end user device;

N OLT-side wavelength converters, each said converter being associated with a particular one of said OLTs and having an OLT port and a multiplexer port;

N ONU-side wavelength converters, each said converter being associated with a particular one of said OLT-side wavelength converters and having an ONU port and a demultiplexer port;

an OLT-side optical multiplexer having at least N branching ports and one common port;

said bidirectional communication between OLT multiplexer port and ONU port being effected through a single optical fiber as a high Gbps rate upstream burst mode signal with a first bit valid verification to ascertain the integrity of a burst-mode data stream as well as a high Gbps continuous mode downstream signal corresponding to each of N OLT side devices and each of N ONU side devices;

said single optical fiber additionally carrying a low Gbps rate continuous mode monitoring the integrity of the optical fiber;

an ONU-side optical demultiplexer having at least N branching ports and one common port;

a multiplex optical fiber communicatively connecting said common port of said OLT-side optical multiplexer and said common port of ONU-side optical demultiplexer;

and wherein, for all values of "i" ranging from 1 to N:

a unique intermediate downstream wavelength $\lambda_{iD}$ and a unique intermediate upstream wavelength $\lambda_{iU}$ are assigned to the "i-th" of said OLT-side wavelength converters and the "i-th" of said ONU-side wavelength converters;

the "i-th" said OLT is connected for data communications via its OLT optical connection to the OLT port of the "i-th" said OLT-side wavelength converter and is configured:

i. to be communicatively coupled to one of said data sources, from which downstream data for said end user devices is to be received and to which upstream data from said end user devices is to be transmitted;

ii. to transmit said downstream data to the ONU predetermined for said OLT;

iii. to receive said upstream stream data from said predetermined ONU; and said OLT transmitting said downstream data at a downstream base wavelength "$\lambda_{BD}$" and receiving said upstream data at an upstream base wavelength "$\lambda_{BU}$" through an OLT optical connection; and i. said multiplexer port of said "i-th" OLT-side wavelength converter is communicatively coupled to the "i-th" said branching port of said OLT-side optical multiplexer;

each of said ONUs is connected for data communications via its ONU optical connection to the ONU port of the ONU-side wavelength converter with which said ONU is associated and each said ONU is configured:

i. to be communicatively coupled to at least one of the end user devices, to which said downstream data is to be transmitted and from which said upstream data is to be received;

ii. to receive said downstream data from the OLT in communication with said ONU;

iii. to transmit said upstream stream data to said OLT; and iv. said ONU receiving said downstream data at said downstream base wavelength $\lambda_{BD}$ and transmitting said upstream data at said upstream base wavelength $\lambda_{BU}$ through an ONU optical connection;

said demultiplexer port of the "i-th" said ONU-side wavelength converter is communicatively coupled to the "i-th" said branching port of said ONU-side optical demultiplexer;

the "i-th" said OLT-side wavelength converter is operable to convert light at wavelength $\lambda_{BD}$ that is input at its OLT port to light at a wavelength $\lambda_{iD}$ carrying said downstream data that is output at its multiplexer port, and to convert light at wavelength $\lambda_{BU}$ carrying said upstream data that is input at its multiplexer port to light at wavelength $\lambda_{iU}$ that is output at its OLT port;

the "i-th" said ONU-side wavelength converters is operable to convert light at wavelength $\lambda_{iD}$ that is input at its demultiplexer port to light at wavelength $\lambda_{BD}$ carrying said downstream data that is output at its ONU port, and to convert light at wavelength $\lambda_{BU}$ carrying said upstream data that is input at its ONU port to light at wavelength $\lambda_{iU}$ that is output at its multiplexer port;

said OLT-side optical multiplexer is operable to:

i. receive through its "i-th" branching port downstream data at said intermediate downstream wavelength $\lambda_{iD}$, and aggregate and output all said downstream data as a multiplexed downstream data signal through its common port to said multiplex optical fiber; and ii. receive from said multiplex optical fiber through its common port an upstream multiplexed data signal including light of any one or more of said intermediate upstream wavelengths and demultiplex said signal by sending substantially all of the light of wavelength $\lambda_{iU}$ to said i-th branching port of said multiplexer;

said ONU-side optical demultiplexer is operable to:

i. receive through its "i-th" branching port upstream data at said intermediate upstream wavelength $\lambda_{iU}$, and aggregate and output all said upstream data as said upstream multiplexed upstream data signal through its common port to said multiplex optical fiber; and ii. receive from said multiplex optical fiber through its common port said multiplexed downstream data signal including light of any or all of said intermediate downstream wavelengths and demultiplex said signal by sending substantially all of the light of wavelength $\lambda_{iD}$ to the i-th branching port of said multiplexer.

4. A system as recited by claim 3, further comprising:

an auxiliary OLT having an auxiliary OLT optical connection and an auxiliary ONU having an auxiliary ONU optical connection;

an auxiliary OLT-side wavelength converter having an auxiliary OLT port and an auxiliary multiplexer port; and an auxiliary ONU-side wavelength converter having an auxiliary ONU port and an auxiliary demultiplexer port;
and wherein:

said auxiliary OLT and said auxiliary ONU are appointed to be in bidirectional communication for transmission of auxiliary downstream data of low Gbps data monitoring the integrity of the multiplex optical fiber from said auxiliary OLT to said auxiliary ONU and transmission of auxiliary upstream data from said auxiliary ONU to said auxiliary OLT through said multiplex optical fiber;

said auxiliary OLT is configured to transmit auxiliary downstream data at said downstream base wavelength $\lambda_{BD}$ and receive auxiliary upstream data at said upstream base wavelength $\lambda_{BU}$, through said auxiliary OLT optical connection;

said auxiliary OLT is connected via its auxiliary OLT optical connection to said auxiliary OLT port of said auxiliary OLT-side wavelength converter for data communications at said downstream base wavelength $\lambda_{BD}$ and said upstream base wavelength $\lambda_{BU}$;

said auxiliary multiplexer port is communicatively coupled to one of said branching ports of said OLT-side optical multiplexer;

said auxiliary ONU is configured to receive said auxiliary downstream data at said downstream base wavelength $\lambda_{BD}$ and transmit said auxiliary upstream data at said upstream base wavelength $\lambda_{BU}$, through said auxiliary ONU optical connection;

said auxiliary ONU is connected via its auxiliary ONU optical connection to said auxiliary ONU port of said auxiliary ONU-side wavelength converter for data communications at said downstream base wavelength $\lambda_{BD}$ and said upstream base wavelength $\lambda_{BU}$;

said auxiliary demultiplexer port is communicatively coupled to one of said branching ports of said ONU-side optical demultiplexer;

said auxiliary OLT-side wavelength converter is operable to convert light at wavelength $\lambda_{BD}$ that is input at said auxiliary OLT port to light at an auxiliary downstream wavelength $\lambda_{SD}$ carrying said downstream data that is output at said auxiliary multiplexer port, and to convert light at wavelength $\lambda_{SU}$ carrying said upstream data that is input at said auxiliary multiplexer port to light at an auxiliary upstream wavelength $\lambda_{BU}$ that is output at said auxiliary OLT port;

said auxiliary ONU-side wavelength converter is operable to convert light at wavelength $\lambda_{SD}$ that is input at said auxiliary demultiplexer port to light at wavelength $\lambda_{BD}$ carrying said downstream data that is output at said auxiliary ONU port, and to convert light at wavelength $\lambda_{BU}$ carrying said upstream data that is input at said auxiliary ONU port to light at wavelength $\lambda_{SU}$ that is output at said auxiliary multiplexer port;

said OLT-side optical multiplexer is operable to receive said auxiliary downstream data at said wavelength $\lambda_{SD}$ through one of its branching ports and output said auxiliary downstream data through its common port and to receive said auxiliary upstream data at said wavelength $\lambda_{SU}$ through its common port and output said auxiliary upstream data through said one of its branching ports; and said ONU-side optical demultiplexer is operable to receive said auxiliary upstream data at said wavelength $\lambda_{SU}$ through one of its branching ports and output said auxiliary upstream data through its common port and to receive said auxiliary downstream data at said wavelength $\lambda_{SD}$ through said one of its branching ports and output said auxiliary upstream data through its common port.

5. A system as recited by claim 4, wherein said auxiliary upstream wavelength $\lambda_{SU}$ is 1390 nm and said auxiliary downstream wavelength $\lambda_{SD}$ is 1610 nm, both wavelengths being present in an optically strongly attenuated region of optical transmission spectrum of the optical fiber.

6. A system as recited by claim 3, further comprising an ONU multiplexer/splitter associated with each of said ONUs, said ONU multiplexer/splitter having an ONU splitter common port and plural ONU splitter branching ports, said ONU splitter common port being communicatively connected to said ONU and each said end user device associated with said ONU being communicatively connected to one of said ONU splitter branching ports.

7. A system as recited by claim 3, wherein each said OLT is connected to the OLT-side wavelength converter associated therewith by an OLT optical fiber.

8. A system as recited by claim 3, wherein each said ONU is connected to the ONU-side wavelength converter associated therewith by an ONU optical fiber.

9. A system as recited by claim 3, wherein said downstream data of OLTs and ONUs to is transmitted in a continuous mode transmission.

10. A system as recited by claim 3, wherein said upstream data of ONUs and OLYs is transmitted in a burst mode transmission.

11. A system as recited by claim 3, wherein said downstream data of OLTs and ONUs is transmitted in a continuous mode transmission and said upstream data of ONUs and OLTs is transmitted in a burst mode transmission.

12. A system as recited by claim 11, wherein said downstream data of OLTs and ONUs is transmitted at a data rate faster than a transmission data rate of said upstream data.

13. A system as recited by claim 12, wherein said downstream data of OLTs and ONUs is transmitted at a data rate of at least about 2.5 Gbps and said upstream data is transmitted at a rate of at least about 1.25 Gbps.

14. A system as recited by claim 3, wherein said downstream base wavelength is 1490 nm and said upstream base wavelength is 1310 nm.

15. A system as recited by claim 3, wherein said intermediate upstream wavelengths are selected from the group consisting of 1270, 1290, 1310, 1330, 1350, 1370, 1390, 1410 and 1430 nm and said intermediate downstream wavelengths are selected from the group consisting of 1450, 1470, 1490, 1510, 1530, 1550, 1570, 1590, and 1610 nm.

16. A system as recited by claim 3, wherein said value of N is at most 8, said intermediate upstream wavelengths are selected from the group consisting of 1270, 1290, 1310, 1330, 1350, 1370, 1410 and 1430 nm, and said intermediate downstream wavelengths are selected from the group consisting of 1450, 1470, 1490, 1510, 1530, 1550, 1570, and 1590 nm.

17. A system as recited by claim 16, wherein the value of N is 8.

18. A system as recited by claim 17, wherein said downstream data is transmitted at a data rate of at least about 2.5 Gbps and said upstream data is transmitted at a rate of at least about 1.25 Gbps.

19. A system as recited by claim 3, wherein said media access control system comprises a media access controller associated with each of said OLTs.

20. A kit of parts for retrofitting an optical fiber network system configured for bidirectional transmission of downstream and upstream digital data traffic between a plurality of data sources and a plurality of end user devices, the data traffic comprising data to be transmitted specifically to and from one or more of said end user devices, the kit including:
a plurality of "N" OLT-side wavelength converters;
a plurality of N ONU-side wavelength converters;
an OLT-side optical multiplexer having at least N branching ports and one common port; and
an ONU-side optical demultiplexer having at least N branching ports and one common port;
and wherein, for all 1" values ranging sequentially from 1 to N:
said bidirectional communication between OLT multiplexer port and ONU port being effected through a single optical fiber as a high Gbps rate upstream burst mode signal with a first bit valid verification to ascertain the integrity of a burst-mode data stream as well as a high Gbps continuous mode downstream signal corresponding to each of N OLT side devices and each of N ONU side devices;
said single optical fiber additionally carrying a low Gbps rate continuous mode monitoring the integrity of the optical fiber;
the "i-th" said OLT wavelength converter is operable:
i. to convert light at wavelength $\lambda_{BD}$ that is appointed to carry downstream data and input at its OLT port to light at a unique preselected downstream wavelength $\lambda_{iD}$ that is output at its multiplexer port; and
ii. to convert light at wavelength $\lambda_{BU}$ that is appointed to carry upstream data that is input at its multiplexer port to light at a unique, preselected upstream wavelength $\lambda_{iU}$ that is output at its OLT port;
the "i-th" said ONU-side wavelength converter is operable:
i. to convert light at wavelength $\lambda_{iD}$ appointed to carry said downstream data that is input at its demultiplexer port to light at wavelength $\lambda_{BD}$ that is output at its ONU port; and
ii. to convert light at wavelength $\lambda_{BU}$ carrying said upstream data that is input at its ONU port to light at wavelength $\lambda_{iU}$ that is output at its multiplexer port;
the "i-th" said branching port of said OLT-side optical multiplexer is adapted to be connected to the multiplexer port of the "i-th" said OLT-side wavelength converter;
said OLT-side optical multiplexer is operable to:
i. receive through its "i-th" said branching port downstream data at said intermediate downstream wavelength $\lambda_{iD}$, and aggregate and output all said downstream data as a multiplexed downstream data signal through its common port to said multiplex optical fiber; and
ii. receive from said multiplex optical fiber through its common port an upstream multiplexed data signal including light of any one or more of said intermediate upstream wavelengths and demultiplex said signal by sending substantially all of the light of wavelength $\lambda_{iU}$ to the i-th said branching port of said multiplexer;
the "i-th" said branching port of said ONU-side optical demultiplexer is adapted to be connected to the demultiplexer port of the "i-th" said ONU-side wavelength converter;
said common port of said ONU-side optical demultiplexer is adapted to be connected to said common port of said OLT-side optical multiplexer;
wherein said ONU-side optical demultiplexer is operable to:
i. receive through its "i-th" branching port upstream data at intermediate upstream wavelength λiU, and aggregate and output all said upstream data as said upstream multiplexed upstream data signal through its common port to said multiplex optical fiber; and ii. receive from said multiplex optical fiber through its common port said multiplexed downstream data signal including light of any or all of said intermediate downstream wavelengths $\lambda_{iD}$, and demultiplex said signal by sending substantially all of the light of wavelength $\lambda_{iD}$ to said i-th branching port of said multiplexer.

21. In a method for bidirectional optical transmission of downstream and upstream digital data traffic between a plurality of "N" OLTs designatable by sequential numbers from 1 to "N" and communicatively connected to a plurality of data sources and an equal plurality of "N" ONU groups, each associated with a specific one of the OLTs and comprising at least one ONU, each ONU being communicatively connected to an end user device, the data traffic comprising downstream data sets, each appointed to be transmitted from one of said data sources to a specific one of said end user devices and upstream data sets, each appointed to be transmitted from one of said end user devices to a specific one of said data sources, and wherein each said downstream data set is optically transmitted from one of said OLTs and received by the ONU associated therewith as downstream light having a downstream base wavelength $\lambda_{BD}$ and each said upstream data set is optically transmitted from one of said ONUs and received by the OLT associated therewith as upstream light having an upstream base wavelength $\lambda_{BU}$, the improvement wherein the method further comprises, for all values of "i" ranging from 1 to N:
converting said light at wavelength $\lambda_{BD}$ transmitted by said "i-th" OLT to converted downstream light having a unique intermediate downstream wavelength $\lambda_{iD}$;
multiplexing said converted downstream light into multiplexed downstream light comprising a plurality of downstream spectral components, each encompassing one of said intermediate downstream wavelengths $\lambda_{iD}$;
transmitting said multiplexed downstream light through a multiplex optical fiber as burst mode signals;
demultiplexing said multiplexed downstream light transmitted through said multiplex optical fiber to separate said downstream spectral components;
reconverting light of each of said downstream spectral components back into reconverted light at said downstream base wavelength $\lambda_{BD}$;
receiving light reconverted from the downstream spectral component encompassing wavelength $\lambda_{iD}$ at said "i-th" ONU;
converting said light at wavelength $\lambda_{BU}$ transmitted by said "i-th" ONU to converted upstream light having a unique intermediate upstream wavelength $\lambda_{iU}$;
multiplexing said converted upstream light into multiplexed upstream light comprising a plurality of upstream spectral components, each encompassing one of said intermediate upstream wavelengths $\lambda_{iU}$;
transmitting said multiplexed upstream light through said multiplex optical fiber as burst mode signals at a high Gbps rate;
demultiplexing said multiplexed upstream light transmitted through said multiplex optical fiber to separate said upstream spectral components;
reconverting light of each of said upstream spectral components back into reconverted light at said upstream base wavelength $\lambda_{BU}$;
receiving light reconverted from the upstream spectral component encompassing wavelength $\lambda_{iU}$ at said "i-th" OLT.

22. The improved method of claim 21, further comprising converting light at wavelength $\lambda_{BD}$ transmitted by an auxiliary OLT to converted downstream auxiliary light having an intermediate downstream auxiliary wavelength $\lambda_{SD}$;

including said converted downstream auxiliary light in said multiplexed downstream light as an auxiliary downstream spectral component encompassing said intermediate downstream auxiliary wavelength $\lambda_{SD}$;

reconverting light of said auxiliary downstream spectral component back into reconverted auxiliary downstream light at said downstream base wavelength $\lambda_{BD}$;

receiving light reconverted from said auxiliary downstream spectral component encompassing wavelength $\lambda_{SD}$ at an auxiliary ONU;

converting light at wavelength $\lambda_{BD}$ transmitted by an auxiliary ONU to converted upstream auxiliary light having an intermediate upstream auxiliary wavelength $\lambda_{SU}$;

including said converted upstream auxiliary light in said multiplexed upstream light as an auxiliary upstream spectral component encompassing said intermediate upstream auxiliary wavelength $\lambda_{SU}$;

reconverting light of said auxiliary upstream spectral component back into reconverted auxiliary upstream light at said upstream base wavelength $\lambda_{BU}$;

receiving light reconverted from said auxiliary upstream spectral component encompassing wavelength $\lambda_{SU}$ at said auxiliary OLT validating the integrity of the optical fiber.

23. A system as recited by claim 4, wherein said multiplex optical fiber exhibits a greater attenuation at said auxiliary upstream wavelength $\lambda_{SU}$ and said auxiliary downstream wavelength $\lambda_{SD}$ than at any of said intermediate upstream wavelengths or any of said intermediate upstream wavelengths.

24. A system as recited by claim 17, wherein said downstream base wavelength is 1490 nm and said upstream base wavelength is 1310 nm.

25. A system as recited by claim 3, wherein said value of N is at most 8, said intermediate upstream wavelengths are selected from the group consisting of 1270, 1290, 1310, 1330, 1350, 1370, 1410 and 1430 nm, and said intermediate downstream wavelengths are selected from the group consisting of 1450, 1470, 1490, 1510, 1530, 1550, 1570, and 1590 nm.

26. A system as recited by claim 25, wherein said downstream data is transmitted at a data rate of burst signal at least about 2.5 Gbps, said upstream data is transmitted at a rate of burst signal at least about 1.25 Gbps, and said auxiliary upstream and downstream data are transmitted at a rate of about 100 Mbps.

27. A system as recited by claim 3, wherein said unique intermediate downstream wavelengths and said unique intermediate upstream wavelengths are chosen in accordance with a coarse wavelength division multiplexing protocol.

28. A system as recited by claim 3, wherein said unique intermediate downstream wavelengths and said unique intermediate upstream wavelengths are chosen in accordance with a dense wavelength division multiplexing protocol.

* * * * *